(12) United States Patent
Bakke

(10) Patent No.: US 6,460,900 B1
(45) Date of Patent: Oct. 8, 2002

(54) QUICK CONNECTOR WITH A THROUGH BORE

(75) Inventor: Stig Bakke, Ålgård (NO)

(73) Assignee: Bakke Oil Tools AS, Algard (NO)

(*) Notice: Subject to any disclaimer, the term of this patent is extended or adjusted under 35 U.S.C. 154(b) by 0 days.

(21) Appl. No.: 09/630,932

(22) Filed: Aug. 2, 2000

(30) Foreign Application Priority Data

Aug. 2, 1999 (NO) .............................................. 993724

(51) Int. Cl.⁷ ................................................ F16L 25/00
(52) U.S. Cl. ........................ 285/330; 285/354; 285/387
(58) Field of Search ................................ 285/330, 319, 285/354, 387, 388

(56) References Cited

U.S. PATENT DOCUMENTS

| | | | | |
|---|---|---|---|---|
| 4,348,956 A | * | 9/1982 | Schmidlin | 102/377 |
| 5,350,200 A | * | 9/1994 | Peterson et al. | 285/330 |
| 5,362,110 A | * | 11/1994 | Bynum | 285/315 |
| 5,586,791 A | * | 12/1996 | Kirchner et al. | 285/179 |

FOREIGN PATENT DOCUMENTS

| | | |
|---|---|---|
| DE | 1066 515 | 10/1959 |
| EP | 0 626 535 | 11/1994 |
| EP | 0 771 933 | 6/1998 |

* cited by examiner

Primary Examiner—Teri Pham Luu
(74) Attorney, Agent, or Firm—Knobbe Martens Olson & Bear LLP.

(57) ABSTRACT

A quick connector (10,12) is to facilitate the connecting of the connecting end of coiled tubing and the connecting end of a tool. For this purpose, the connector comprises two connectable and lockable main parts (10 and 12) formed to be screwed to the end of coiled tubing and the tool, respectively, when the main parts (10 and 12) are in separate positions. A first main part (10) has a freely ending pin element (16) conically narrowing towards said free end, with elongate, axially directed, circumferentially distributed ridges (20) with intermediate grooves (18). A second main part (12) has a pin-element-accommodating bore (22) of complementarily conical shape, defined by corresponding ridges (24) with intermediate grooves (26). At least one set of elongate ridges (24 and/or 20) have rounded top portions.

8 Claims, 2 Drawing Sheets

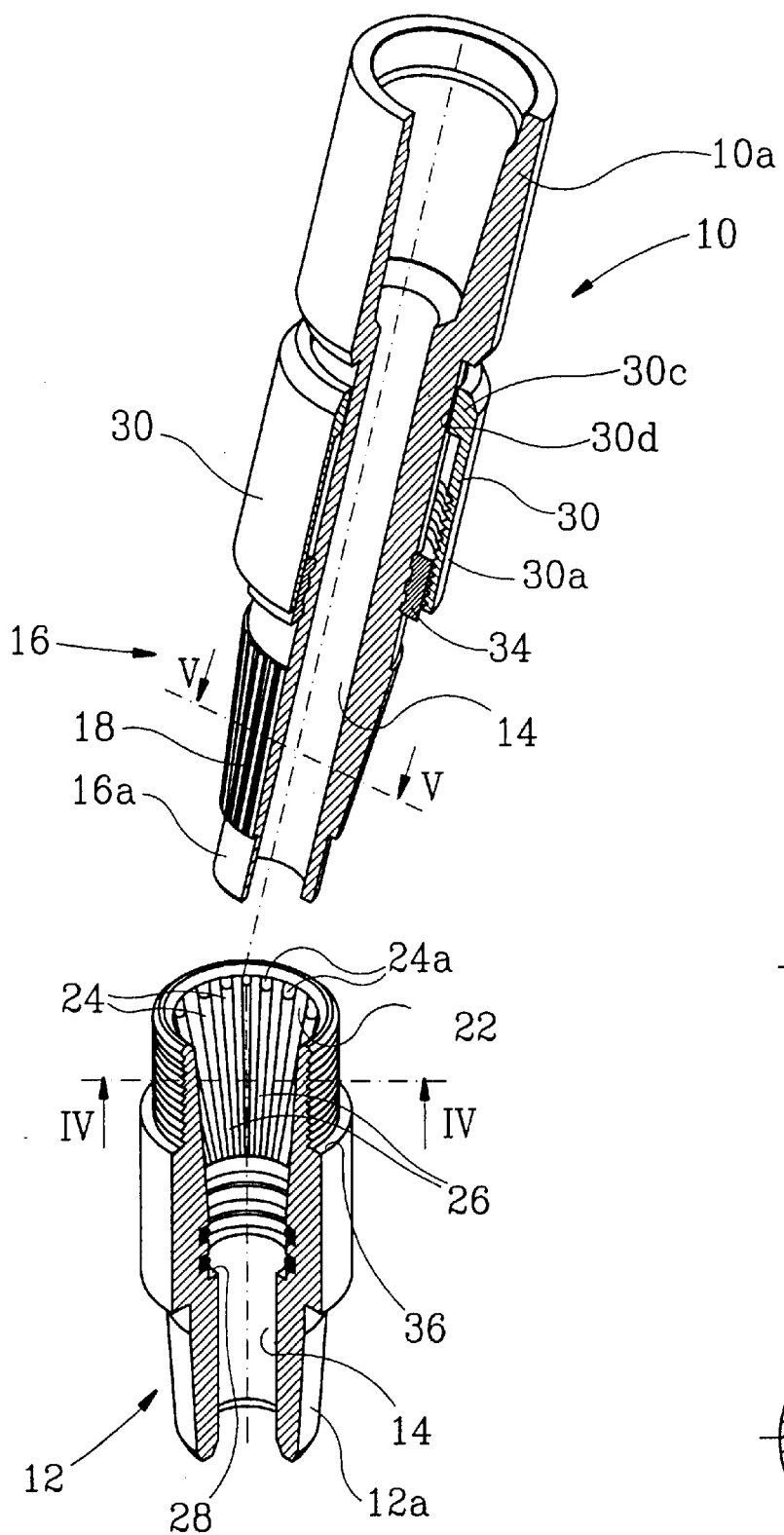
FIG. 4
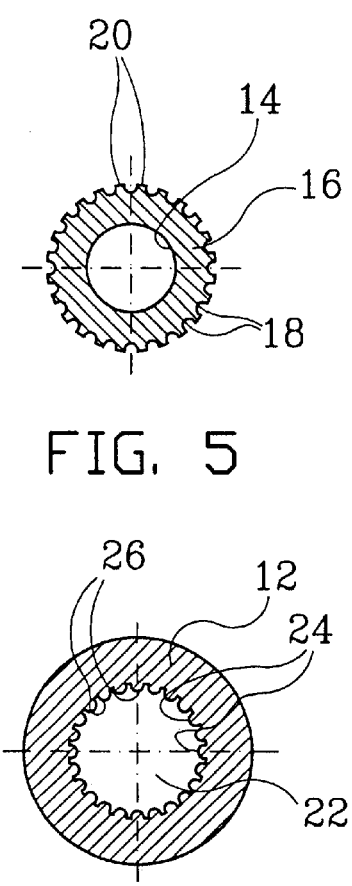
FIG. 5
FIG. 6

QUICK CONNECTOR WITH A THROUGH BORE

BACKGROUND

This invention relates to a quick connector with a through bore in its connected position, comprising two main parts, each formed to be screwed to a pipe-/socket-shaped connecting portion of respectively a pipe, preferably coiled tubing, and a tool or other equipment therefor, wherein a first main part comprises a conical pin element narrowing towards its free end, whereas a second main part comprises a pin-accommodating bore of an essentially complementary conical extent.

Such a connector is suitable for use in connection with pipes and tools with a threaded socket, for example for connecting a tool to the end of coiled tubing. Of the two sleeve-shaped connecting elements of the connector, one can be coaxially inserted into/extracted from the other, and the engagement established can be secured by a releasable locking device.

When coiled tubing is in use, it is provided with a tool at its free end, for example an impact tool. In their inoperative condition, the tools are suspended by means of slips in the drill floor, for example.

With a desired tool in the suspended position, the coiled tubing is run out from its drum by means of an injector arranged thereto, for the connection of the suspended tool. The end of the coiled tubing is formed with external threads for screwing to an internally threaded socket-like connecting portion of the tool.

Coiled tubing are relatively rigid and buckled, which is due partly to their tendency of plastic deformation when bended in particular ways, and it is often very difficult to make the externally threaded portion of coiled tubing enter the internally threaded bore of the connecting portion of the tool with the mutually adapted threads in engagement. Therefore, the big and heavy tool mostly has to be oriented and adapted to the connecting end of the coiled tubing, which may adopt a mainly stationary position, as the tool is rotated manually for its connecting portion to be connected to the end of coiled tubing.

This operation of screwing together is work which is carried out manually, and which is often very time-consuming because it is an invariable requirement that the cooperating threads engage each other with precision.

German publication No. 1 066 515 discloses a drill string pipe, which has, at its connecting end portion above another drill string pipe, a socket which has, in the longitudinal direction of the pipe, a first portion in which the socket bore widens conically towards its free end, which internal, conical portion ends at a distance from the free end of the socket. Between the conical portion and the free end of the socket is formed a circular-cylindrical intermediate portion. The second pipe which is to be connected by its end adjacent to the socket of the former drill string pipe, has a pin element, whose external surface is essentially complementarily corresponding to the internal surface portions of the connector sleeve. The conical portion of the pin element narrows towards, and extends to, the free end thereof, and this portion is positioned in the internal conically extending region of the socket. In the upper internal circular-cylindrical portion of the socket, in whose region the correspondingly formed portion of the pin element is located in the position of connection, there are formed axially directed grooves, which are engaged, in a longitudinally displaceable manner, by teeth of a gear rim fixed externally on the pin element. A lock mandrel secures the engagement of the pin element in the bore of the socket, and is firmly screwed to the exterior of the socket, which has for this purpose external threads in the region of the circular-cylindrical portions of the socket and pin element. This lock mandrel is relatively complicated and cooperates with an external flange on the pin element. This known connector is not pressure-tight, and thus unsuitable in oil drilling. The teeth of the gear rim and the axially directed grooves engaged in an axially displaceable manner by the straight teeth are not formed on the conical portions of the cooperating connector parts (the inside of the socket, the outside of the pin element), and teeth and grooves are not particularly elongate.

SUMMARY

According to the invention, is to be possible for a pipe-shaped threaded end of, for example, coiled tubing to be connected to any tool by an intermediate quick connector, whose one threaded main part is formed to be screwed to the threaded end of coiled tubing, whereas its other threaded main part is formed to be screwed to a tool of a complementarily threaded connecting portion, said two main parts being connectable to one another.

It is a simple matter to connect one main part of the connector by screwing to the end of coiled tubing, because this main part which is light in weight and fit for manual handling compared to the complete tool, may easily be oriented and positioned relative to the end of coiled tubing, which end often adopts, due to its stiffness and lack of flexibility, a stationary position during the screwing together, and similarly, the screwing together of the other main part of the connector and the threaded connecting portion of the tool represents an easy operation. Then it remains to connect said two main parts of the connector, and it is the simplification and improvement of the screwing together of the main parts of the connector that has been the aim of the present invention.

The connectable main parts of the connector, which are concentric in the connected condition of the connector, are formed so that by a pin-shaped portion one main part coaxially engages a bore which is formed in the other main part, said pin-shaped insert portion being formed narrowing in the direction towards its free end, the internal wall surface defining the pin-accommodating bore of the other main part being formed with an essentially complementary extent. Each main part is formed with cooperating longitudinal elongate, axial, ridges distributed circumferentially with intermediate channel-shaped grooves, the axially directed ridges of one main part having a rounding at the top of the ridges.

These rounded portions of the elongate axially directed ridges, and possibly of the channel-shaped bottoms of the intermediate grooves, ensure a precise guiding in the insertion of the pin element into the bore defined by internal ridges and intermediate grooves.

The first portion of the conically narrowing pin element of the one main part, inserted into the bore defined by an internal conical wall surface, will, due to its conicity, not be in any but random contact with the ridges projecting radially inwards, so that normally the pin element will have entered some distance into said bore before its elongate axially directed ridges obtain a guiding contact with the ridges/grooves of the bore-defining internal wall, for the ridges of one part to be guided into the grooves of the other part, so that finally an engagement has been established like between axial sliding grooves. Such an engagement is not effective from the moment when the two conical engagement means reach coaxial positions, as the engagement—the ridges of one part engaging the grooves of the other part and vice versa—is established only at a somewhat later point, and the roundings at the top portions of the ridges, and possibly at the bottom portions of the grooves, ensure, during the successive insertion of the pin element into the bore, that a precisely guided insertion takes place, so that this engagement is established smoothly and reliably, without the risk of the parts jamming before the desired final position has been reached.

This ideal engagement of said ridges and intermediate grooves may be secured by a suitable locking device, for example in the form of a lock mandrel with internal threads at one axial portion cooperating with external threads of one of the main parts, the lock mandrel being formed at its opposite axial end portion to enclose a split expansion ring, which engages, by internal projections, external grooves of the cylindrical portion of the other main part.

The connector is to be pressure-tight, and is therefore provided with two seal rings positioned near one another in the area between the free end portion of the pin element and the surrounding internal wall surface portion defining the bore of the other main part of the connector at this point.

The simplified, improved connection of a suspended tool to an end of coiled tubing by means of the interconnected connector according to the invention is caused by the combination of the conical cooperating engaging elements and the rounding of said elongate, circumferentially distributed, axially directed grooves and possibly intermediate grooves at the ridge top portions and groove bottom portions. Through a combined effect these two features of the invention facilitate and control the accurate centric insertion of said pin element of one main part into the pin-accommodating bore of the other main part, until a complete engagement has been established evenly in the circumferential direction and in a considerable longitudinal extent axially, in which the connector may be secured in the suggested way or in a technically equivalent way.

Especially in the pin-accommodating bore of one main part of the connector, the ridges may have, at their free ends, a portion smoothly merging with a cylindrical portion, which has no ridges. The ridges defining, together with the intermediate grooves, the pin-accommodating bore may have similar sloping transition surfaces at their upper axial ends.

Further objectives, advantages and features of the present invention will appear from the following specification referring to a non-limiting example of a preferred embodiment.

BRIEF DESCRIPTION OF THE DRAWINGS

Reference is made to the accompanying drawings, in which:

FIG. 4 shows a perspective split view of the two main parts of the connector prior to the aligning and coaxial insertion of the upper part into the central, complementarily conical bore of the other part;

FIG. 5 is a section along the line V—V in FIG. 4, and shows a cross-section of the conical pin portion of one (the upper) main part, which has rounded groove bottoms between elongate axial ridges evenly distributed circumferentially; and FIG. 6 is a sectional view along the line IV—IV in FIG. 4, and shows a cross-section of the free end portion of the other (lower) main part of the connector, which has external threads for the internal threads of a lock mandrel.

DETAILED DESCRIPTION

Figure 1:
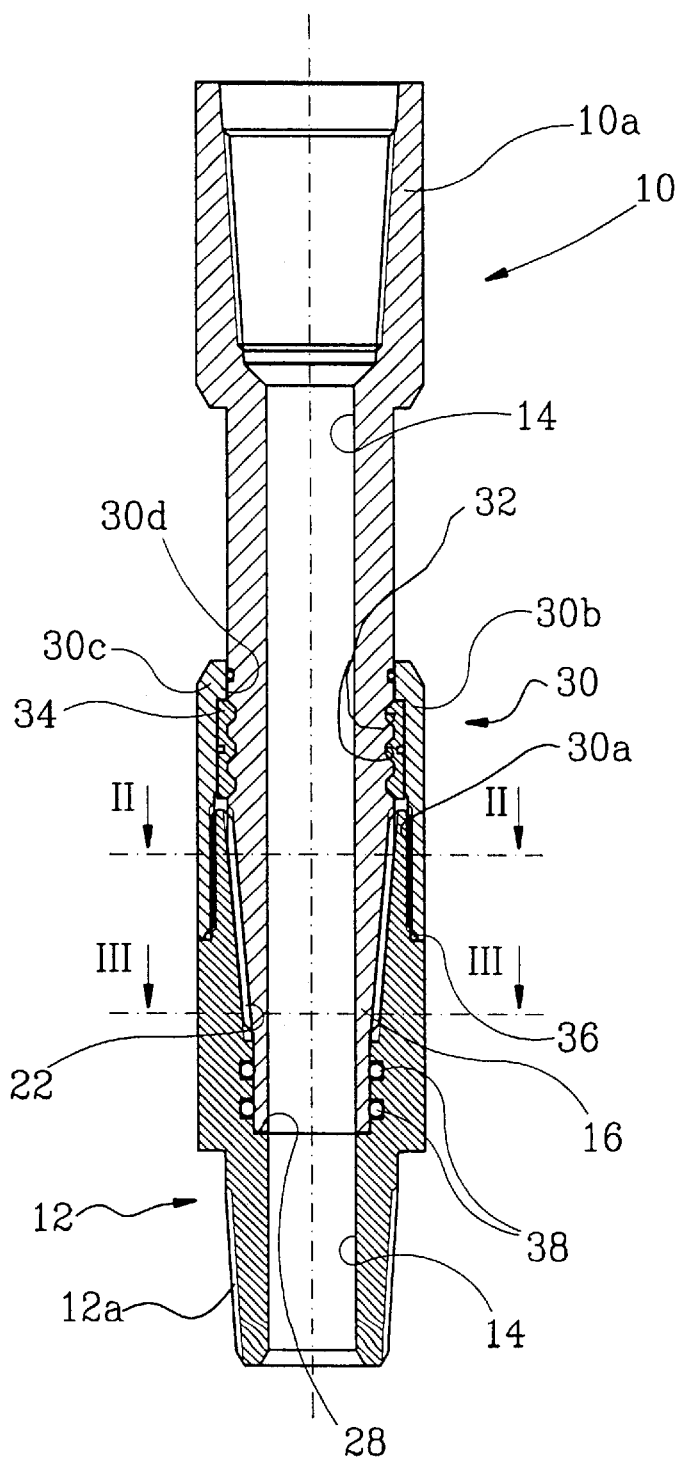
FIG. 1 shows an axial section through a connector according to the invention in its active, connected and locked condition, the end of coiled tubing and the tool, which will normally be firmly connected by screwing at either end of the connector, being left out.

The connector comprises two elongate, straight sleeve-shaped main parts 10 and 12, in their concentric connected condition defining a bore 14 extending axially therethrough. The first main part 10, being the upper one in the orientation shown, exhibits an internally threaded socket portion 10a at its upper free end of a larger diameter than the rest of the bore 14. This socket portion 10a is meant to be screwed firmly to an externally threaded end portion of coiled tubing, not shown.

In a corresponding manner, the second main part 12, the lower one in the exemplary embodiment of the connector has a tapered, externally threaded connecting portion 12a for an internally threaded connecting box/socket of a tool (not shown), for the screwing thereof to the second main part 12.

To facilitate the connecting of the first and second main parts when they are connected to an end of coiled tubing and a tool, respectively, the first main part 10 is formed with an elongate pin-shaped insert element 16 tapering conically towards its free end and with an annular cross-sectional shape, FIG. 5, wherein the outer circumferential portion is formed with elongate, axially directed, circumferentially distributed longitudinal first grooves 18 with rounded bottom portions with intermediate first ridges 20, which are not rounded in this embodiment.

The second main part 12 of the connector has a pin-accommodating bore 22 shaped essentially complementary to the conicity of the pin element/insert element 16 and defined by elongate, axially directed, circumferentially distributed second ridges 24, whose top portions are rounded like the rounded first grooves 18 of the pin-shaped insert element 16. Between adjacent second ridges 24 are second grooves 26, in this embodiment not rounded at the second groove bottoms like the first grooves of the pin element 16.

These rounded second ridges 24 and first grooves 18 are those that will finally engage one another matchingly in the completely connected position in this embodiment.

As the insertion of the pin-shapes insert element 16 of the first main part 10 into the complementary, downwards narrowing conical bore 22 begins, the outer end portion 16a of the pin element 16 does not have to be in contact with the bore-defining second ridges 24 of this widest bore section, and therefore the end portion 16a may be cylindrical, without ridges or splines. As the insertion proceeds, the first ridges 20 of the pin element 16 may possibly contact the sloping transition surfaces 24a of the second ridges 24 defining the pin-accommodating bore, FIG. 4, and due to the rounded second ridges 24, the first ridges of the pin element 16 will seek towards their complementary second grooves 26, and thereby the conical pin-shaped insert element 16 is guided gradually, until said element 16 is guided with great accuracy into a matching engagement with the rounded first grooves 18 of the pin element 16.

Figure 2:
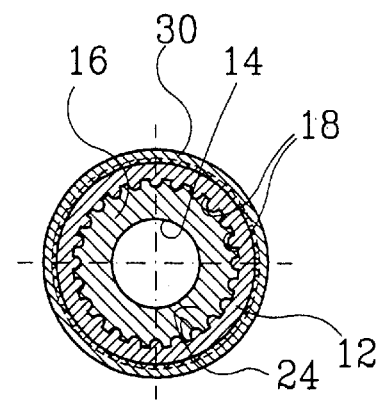
FIG. 2 shows a transversal section in accordance with the radial plane of section II—II in FIG. 1.
Figure 3:
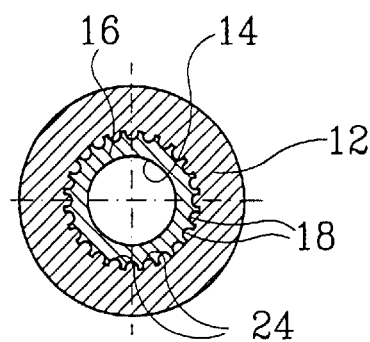
FIG. 3 shows a transversal section according to the radial plane of section III—III in FIG. 1.

When the two main parts 10 and 12 have been brought into engagement with each other, as shown in FIGS. 1–3, and the rounded elongate ridges 24 matchingly engage the rounded grooves 18 over an essentially axial longitudinal distance, whereby the outer free non-splined portion 16a of the pin element 16 rests by its end surface on an annular internal ledge 28 of the second main part 12, the connected position of the quick connector 10,12 according to the invention has been achieved and needs to be secured.

For the securing of the established connected position of the connector according to the invention, FIG. 1, there is provided, according to the shown exemplary embodiment, a lock mandrel 30 with an internally threaded portion 30a, which extends over a lower portion of the axial length of the lock mandrel 30, whereas the remaining axial section 30b of the lock mandrel 30 has a radially inward annular flange portion 30c at its free end. The annular free surface 30d of the flange portion 30c is formed and positioned to abut an external cylindrical portion of the first main part at a distance from where the coning of the conical pin element 16 starts.

Referring to the connected positions of the main parts 10, 12 of the connector 10,12, FIGS. 1–3, the first main part 10 is formed externally, over an axial portion extending between the free end of the second main part 12 positioned below, and the radially inward end flange 30c, with coarse annular grooves 32 engaged by complementarily shaped projections of a split ring 34.

This ring 34 is surrounded by the upper portion 30b of the lock mandrel 30, and is prevented from escaping axially by means of the annular end flange 30c at the upper end of the lock mandrel 30.

The lower second main part 12 of the connector 10,12 is provided externally with an upward, annular abutment ledge 36 at the lower end of its externally threaded upper portion for the lock mandrel 30, possibly limiting the downward helical movement of the lock mandrel.

The connector 10,12 is to be pressure-tight, and therefore, in the lower bore portion 22 accommodating the pin-element are formed two parallel grooves, which are to accommodate one O-ring seal 38 each.

What is claimed is:

1. A quick connector having first and second connectable portions with a through bore, the connector comprising:
    a conical pin element included in the first portion tapering towards a free end thereof, the element being elongate axially and having first axially directed, elongate, circumferentially distributed grooves with first corresponding ridges interposed therebetween;
    an essentially complementary conical bore included in the second portion accommodating the pin element, the bore being defined by axially directed, elongate second ridges distributed circumferentially, with second channel-like grooves interposed therebetween rounded in top portions of the second portion and configured to cooperate with the first ridges; and
    an internal cylindrical surface and transition portion surfaces included in the second portion and positioned at an end of the second portion receiving the first portion, the transition portion surfaces sloping axially inwardly from the internal cylindrical surface towards rounded top portions of the second ridges.

2. The quick connector of claim 1, wherein, at an end of the first portion receiving the second portion, the first ridges each have an axial longitudinally sloping transition portion surface extending between a top portion of the first ridges and an adjacent external cylindrical surface of the pin element.

3. A quick connector according to claim 1, wherein the second portion is provided internally with an annular abutment ledge opposite to a direction of insertion of the first portion.

4. A quick connector according to claim 1, wherein the first portion includes a lock device having a form of a lock mandrel, which has, in a first longitudinal portion, internal threads for cooperation with external threads formed in the second portion, the lock mandrel having, at its opposite terminal edge surface, an inward annular flange portion, wherein a radially innermost annular surface of said flange is complementary to, and may bear on, a jacket surface of the pin element, the lock mandrel being formed and arranged, in an area between the annular flange and a nearest terminal edge of the second portion, to enclose a split ring.

5. A quick connector according to claim 4, wherein the first portion is formed, in a longitudinal portion above a conical extent of the pin element, with annular grooves which are engageable in an axially non-displaceable and position-fixing manner by the ring.

6. A quick connector according to claim 1, wherein the free end has no ridges.

7. The quick connector of claim 1, wherein the first and second ridges and first and second grooves have cooperating, rounded contours.

8. A quick connector having first and second connectable portions, the connector comprising:
    a conical pin element included in the first portion tapering towards a free end thereof, the element being elongate axially and having axially directed, elongate, circumferentially distributed grooves with corresponding ridges interposed therebetween;
    an essentially complementary conical bore included in the second portion accommodating the pin element, the bore being defined by axially directed, elongate ridges distributed circumferentially thereon, with channel-like grooves interposed therebetween wherein the pin element grooves and the bore ridges and the pin element ridges and the bore grooves are configured to mate respectively with each other and wherein at least one of the mating pin element grooves and the bore ridges and the mating pin element ridges and the bore grooves have a rounded contour;
    internal cylindrical surface and transition portion surfaces included in the second portion and positioned at an end of the second portion receiving the first portion, the transition portion surfaces sloping axially inwardly from the internal cylindrical surface towards at least one of rounded grooves and ridges of the bore;
    a split ring; and
    a lock device releasably securing the first and second portions together, the lock device defining a lock mandrel having, in a first longitudinal portion, internal threads cooperating with corresponding external threads formed in the second portion, the lock mandrel further having, at an opposite terminal edge surface, an inwardly arranged flange portion, wherein a radially innermost annular surface of the flange portion is complementary to and may bear on a jacket surface of the pin element, the lock mandrel being formed and arranged in an area between the flange portion a nearest terminal edge of the second portion so as to enclose the split ring.

* * * * *